United States Patent [19]
Tanaka

[11] Patent Number: 4,833,657
[45] Date of Patent: May 23, 1989

[54] SEMICONDUCTOR FRAME BUFFER MEMORY

[75] Inventor: Shigeru Tanaka, Fujisawa, Japan

[73] Assignee: Kabushiki Kaisha Toshiba, Kawasaki, Japan

[21] Appl. No.: 923,044

[22] Filed: Oct. 24, 1986

[30] Foreign Application Priority Data

Oct. 30, 1985 [JP] Japan .................. 60-243354

[51] Int. Cl.⁴ .................. G11C 8/00; G09G 1/02
[52] U.S. Cl. .................. 365/230.04; 365/189.05; 340/799; 340/801
[58] Field of Search .................. 365/189, 230, 233, 239, 365/240, 219, 221, 78; 340/750, 799, 800, 801, 802

[56] References Cited

U.S. PATENT DOCUMENTS

| | | | |
|---|---|---|---|
| 4,442,503 | 4/1984 | Schütt | 364/900 |
| 4,667,190 | 5/1987 | Fant | 340/798 |
| 4,667,313 | 5/1987 | Pinkham et al. | 365/189 |
| 4,688,032 | 8/1987 | Saito et al. | 340/798 |
| 4,742,474 | 5/1988 | Knierim | 365/230 |

Primary Examiner—Stuart N. Hecker
Assistant Examiner—Glenn A. Gossage
Attorney, Agent, or Firm—Oblon, Fisher, Spivak, McClelland & Maier

[57] ABSTRACT

A semiconductor memory for writing or reading data words in response to prescribed bank address data and bit address data, each word having a prescribed amount of bits, is described. The memory includes a memory array for storing the data words. The memory array includes at least two memory banks adjacent to one another, each bank having a bit area corresponding to the prescribed amount of bits, buffer memory for temporarily storing the data word for writing into the memory array or the data word read from the memory array, a first source for applying the bank address data to the memory array to access the memory banks, a second source for applying the bit address data to the memory banks to access prescribed bit locations of the memory banks, and logic circuitry responsive to the bit address data for cyclically shifting the data word stored in the buffer memory by an amount corresponding to the value of the received bit address data.

5 Claims, 3 Drawing Sheets

SEMICONDUCTOR FRAME BUFFER MEMORY

BACKGROUND OF THE INVENTION

1. Field of the Invention

The present invention relates to a semiconductor memory and, more particularly, to a semiconductor frame buffer memory for temporarily storing image data in bit map control type image display systems of computer installations.

2. Description of the Prior Art

A display device such as a CRT (cathode ray tube) display device is an indispensable component of a computer terminal. Recently such display devices have been improved to achieve higher resolution for use in a bit map control system. This type system allows display control of picture element units, and is commonly used in the display of graphics, as well as characters.

FIG. 7 shows a computer as well that uses a CRT display device 71 of the bit map control type. The computer system basically includes a processor 73, a main memory 74, a frame buffer 72 and the CRT display device 71. The frame buffer 72 is coupled to the processor 73 through a data bus 75 and to the CRT display device 71. The buffer 72 temporarily stores image data to be displayed. As the resolution power of the CRT display device 71 has been improved, and the amount of information per image has increased, a multi-bit memory has been used as the frame buffer 72. In such a multi-bit memory, one word consists of 4 bits or 8 bits, etc., rather than 1 bit. It is likely that such multi-bit memories will become more common in the future.

As the bit map control type CRT display device 71 has become more common, a need has developed for an image processing apparatus that permits image rotation, enlargement, reduction, etc. on the CRT display device 71. Generally, these image processing operations must start from an arbitrary bit position on the CRT display device 71. Data in the frame buffer 72 are connected to prescribed bus lines normally in byte units (8 bits) or word units (16 bits). Thus, the system must have the capability (referred to as bit boundary access function) to read or write byte data or word data starting from any bit position regardless of the location of byte or word boundaries in the frame buffer 72. More particularly, what is needed is the ability to access frame buffer 72 for reading or writing data starting from any bit position on the screen, as illustrated in FIG. 8 when various data items of single-word units of image data stored in the frame buffer are arranged in correspondence to display positions on a non-interlaced type screen.

Conventionally, an apparatus for performing the bit boundary access function included a circuit employing a large number of logic elements outside the memory, i.e., the frame buffer 72. This has led to problems due to the increased number of required circuits and associated higher costs.

SUMMARY OF THE INVENTION

Accordingly, an object of the present invention is to provide a semiconductor memory having a bit boundary access function which is simple to construct and has a relatively low cost.

In order to achieve the above object of the present invention, a semiconductor memory for writing or reading data words in response to prescribed bank address data and bit address data, each word having a prescribed amount of bits, includes memory array for storing the data words. The memory array includes at least two memory banks adjacent to one another, each bank having a bit area corresponding to the prescribed amount of bits, buffer memory for temporarily storing the data word for writing into the memory array or the data word read from the memory array, first source for applying the bank address data to the memory array to access the memory banks, second source for applying the bit address data to the memory banks to access prescribed bit locations of the memory banks, and logic circuit means responsive to the bit address data for cyclically shifting the data word stored in the buffer memory by an amount corresponding to the value of the received bit address data.

Further a semiconductor memory having a bit boundary function in the write-in system can be achieved by the provision of a control circuit which effects control such that the direction of shift by the cyclic shift logic circuit is made the opposite to what it is in read-out and set bits in correspondence to the bit address value are written in.

DESCRIPTION OF THE PREFERRED EMBODIMENTS

Figure 1:
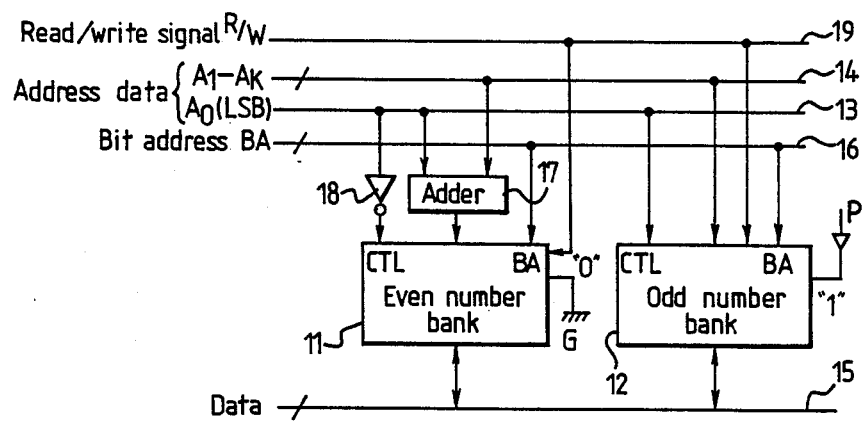
FIG. 1 is a block diagram showing an embodiment of the semiconductor memory according to the present invention.

The present invention will now be described in detail with reference to the accompanying drawings, namely, FIGS. 1 to 6. Throughout the drawings, like reference numerals and letters are used to designate like or equivalent elements for the sake of simplicity of explanation.

Referring now to FIG. 1, an embodiment of the semiconductor memory according to the present invention will be described in detail. FIG. 1 shows a frame buffer for storing image data to be displayed on a CRT display device that employs the bit map control system. The buffer memory comprises an even address number memory bank (even number memory bank) 11 and an odd address number memory bank (odd number memory bank) 12. The least significant bit (LSB) A0 in address data consisting of (k+1) number of bits A0, A1, . . . , Ak is supplied to a first address bus 13 and the remaining k number of bits A1 through Ak in the address data are supplied to a second address bus 14. Assume that a data bus 15 has a capacity of transferring data of 8 bits. Bit address data BA for indicating the location of a specified bit in 8 bits data (1 word) is supplied to a bit address bus 16.

The odd number memory bank 12 is supplied with address data consisting of a least significant bit (LSB), wihch is fixed at a "1" level, from a prescribed potential source P, and the remaining bits A1 through Ak from the second address bus 14, the bit address data BA from the bit address bus 16, and a bit boundary control data CTL in the form of the LSB A0 from the first address bus 13. The even number memory bank 11 is supplied with address data consisting of the LSB, which is fixed at a "0" level, from a ground potential source G, and the remaining bits from adder 17 in the form of the sum of address data A1 through Ak from the second address bus 14 and the LSB A0 from the first address bus 13. In addition, memory bank 11 receives the bit address data BA from the bit address bus 16, and the bit boundary control data CTL. The data CTL comprises the LSB A0 from the first address bus 13 inverted by an inverter 18.

In this embodiment, the adder 17 and the inverter 18 are formed on one chip separate from another chip on which the even and the odd number memory banks 11, 12 are constructed. The even and the odd number memory banks 11, 12 are typically included on an SRAM (static random access memory). Such an SRAM can selectively perform the write operation or the read operation of a word constituted by a plurality of bits in response to receipt of a single address data. A read/-write signal R/W is supplied to both the even and odd number memory banks 11 and 12 through a read/write signal bus 19 changing the modes banks 11 and 12 between the read operation mode or the write operation mode.

Figure 2:
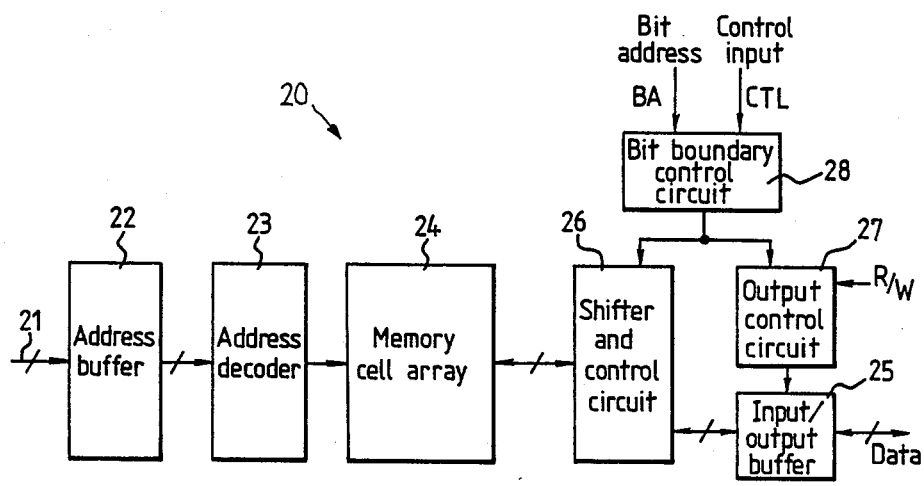
FIG. 2 is a block diagram showing the buffer memory in FIG. 1.

Referring now to FIG. 2, the drawing shows the detail of the even or the odd number memory bank 11, 12 using the SRAM 20. In FIG. 2, the SRAM 20 comprises an internal address bus 21, an address buffer 22, an address decoder 23 and a memory cell array 24. The memory cell array 24 of the SRAM is connected to the data bus 15 through a cyclic shift and control circuit 26 and an input/output buffer 25. The cyclic shift and control circuit 26 is connected to a bit boundary control circuit 28. The input/output buffer 25 is connected to the bit boundary control circuit 28 through an output control circuit 27. The bit boundary control circuit 28 produces various control signals for controlling the cyclic shift and control circuit 26 and the input/output buffer 25 in response to the bit address data BA and the bit boundary control data CTL. Also the read/write signal R/W is applied to the output control circuit 27 from the read/write signal bus 19. The output control circuit 27 controls the output state of the input/output buffer 25. Each of the memory banks 11, 12 performs the following operations: (1) cyclically shifts data read out from the SRAM 20 (referred to as read-out data hereafter) leftward or shift data to be written in the the SRAM 20 (referred to as write-in data hereafter) rightward by a prescribed amount determined by the bit address data BA in response to the bit boundary control data CTL, and (2) keeps the read-out data in the high impedance state or writes the write-in data by prescribed bits in response to the bit address data BA and the bit boundary control data CTL.

The operations of the memory banks 11, 12 will now be described in detail with reference to FIGS. 3 through 6.

Figure 3:
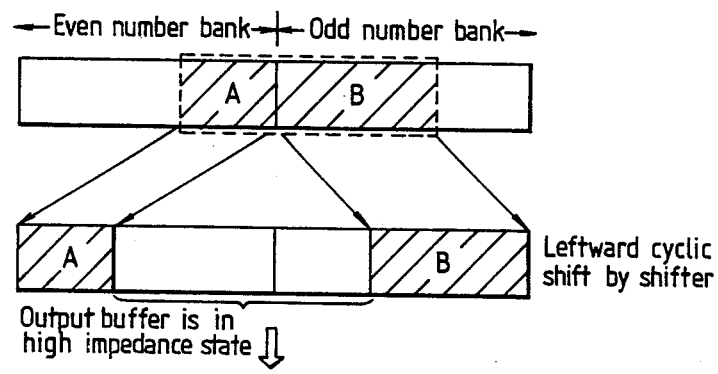
FIG. 3 and FIG. 4 are drawings for explaining two different modes of read operation in the frame buffer of FIG. 2.

(A) READ-OUT OPERATION (A)-1: Assume that, as illustrated in FIG. 3, it is necessary to access data starting from a bit position specified by the bit address data BA in the 8 bits of data of the specified address in the even number memory bank 11, and to read-out data A (e.g., consisting of 3 bits) starting from this specified bit position in the even number memory bank 11 and data B (e.g., consisting of 5 bits) in the succeeding odd number memory bank 12. The LSB A0 of the address data on the address bus 13 is made "0" and the same remaining address bits A1 through Ak are applied to both the memory banks 11 and 12. As a result, the cyclic shift and control circuit 26 causes the byte data read out from the respective memory cell arrays 24 in the memory banks 11 and 12 to be shifted cyclically leftward by the number of bits specified by the bit address input BA. Next, the bit boundary control data CTL controls the input/output buffer 25 for causing a high impedance state for set bits of the output data bits, and a normal output state for the remaining bits. The control effected here is such that the various bit positions in the input/output buffer 25 go to the high impedance state Z or the normal output state X in the manner shown in Table 1 in response to the value of the bit address data BA and the logic level of the bit boundary control data CTL.

TABLE 1

| Bit Address Data BA | State in Input/Output Buffer 25 | |
|---|---|---|
| | Bit Boundary Control Data CTL = 1 | Bit Boundary Control Data CTL = 0 |
| 0 | X X X X X X X X | Z Z Z Z Z Z Z Z |
| 1 | X X X X X X X Z | Z Z Z Z Z Z Z X |
| 2 | X X X X X X Z Z | Z Z Z Z Z Z X X |
| 3 | X X X X X Z Z Z | Z Z Z Z Z X X X |
| 4 | X X X X Z Z Z Z | Z Z Z Z X X X X |
| 5 | X X X Z Z Z Z Z | Z Z Z X X X X X |
| 6 | X X Z Z Z Z Z Z | Z Z X X X X X X |
| 7 | X Z Z Z Z Z Z Z | Z X X X X X X X |
| | MSB ← → LSB | MSB ← → LSB |

Z: high impedance state
X: normal output state

Referring to the Table 1, if, for example, the value of the bit address data BA is "5" and the LSB A0 of the address data is "0", as the bit boundary control data CTL inputted to the even number memory bank 11 is level "1", the first through third bit positions in the input/output buffer 25 are in a normal output state X, and the data A which has been cyclically shifted by 5 bits leftward is outputted to the data bus 15 but the remaining fourth through eighth bit positions are in the high impedance state Z. Fro the odd number memory bank 12, the bit boundary control data CTL input is at level "0" and the first through third bit positions in the input/output buffer 25 are in the high impedance state Z. The fourth through eighth bit positions are in the normal output state X, and so data B, that has been cyclically shifted by 5 bits to the left, is outputted to the data bus 15. In this manner, therefore, required byte data consisting of the data A and B is read out onto the data bus 15.

Figure 4:
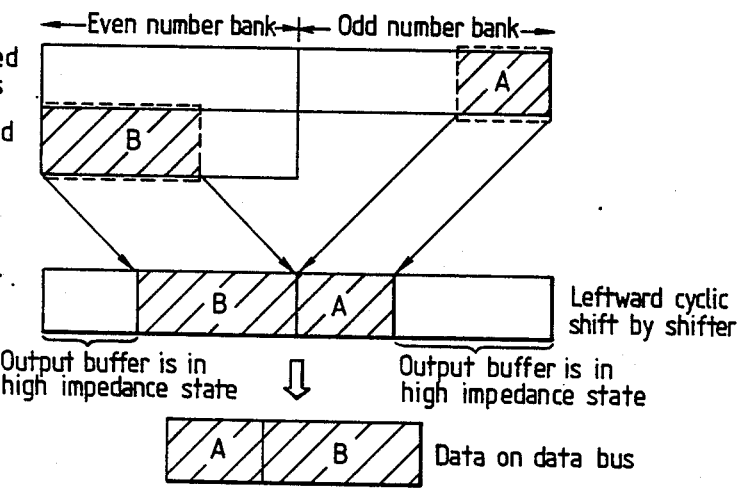

(A)-2: In contrast to the case (A)-1, assume, as illustrated in FIG. 4, it is necessary to access data starting from a bit position specified by the bit address data BA in the 8 bits of data of the specified address in the odd number memory bank 12 and to read-out data A (e.g., consisting of 3 bits) and data B (e.g., consisting of 5 bits). In the even number memory bank 11, the LSB A0 of the address data on the address bus 13 is changed to "1", so the value of the remaining address bits A0 to Ak inputted to the even number memory bank 11 is greater by "1" than the value of the remaining address bits A1 through Ak inputted to the odd number memory bank 12. This is because the remaining bits were incremented by the value "1" of the LSB A0 of the address data. The bit shift operations in the memory banks 11 and 12 are the same as described above when the LSB A0 of the address data is "0". However, for the odd number memory bank 12, the bit boundary control data CTL inputted therein is now "1". If, for example, the value of the bit address data BA inputted therein is "5", data A in the first through third bit positions of the input/output buffer 25 is outputted, while for the even number memory bank 11 data B from the fourth through eighth bit positions in the input/output buffer is outputted. This is because the bit boundary control data CTL inputted to the even number memory bank 11 is "0". The result, therefore, is that required byte data consisting of data A and B is outputted onto the data bus 15.

Figure 5:
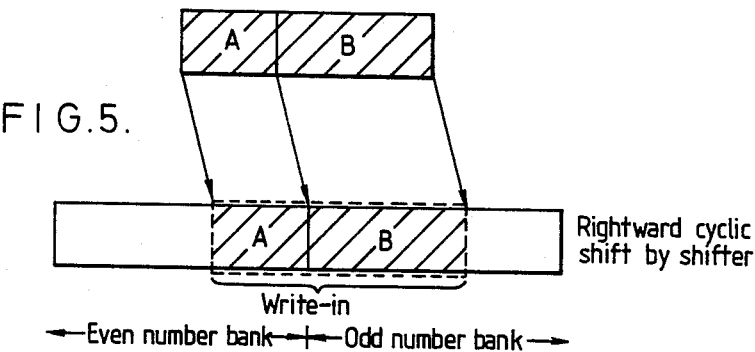
FIG. 5 and FIG. 6 are drawings for explaining two different modes of write operation in the frame buffer of FIG. 2.

(B) WRITE-IN OPERATION (B)-1: Assume it is necessary to receive byte data that is on the data bus 15 (it being supposed for convenience of description that this byte data comprises a data A consisting of 3 bits and a data B consisting of 5 bits) and, as illustrated in FIG. 5, to access a particular address in the even number memory bank 11 specified by the bit address data BA, and write-in the byte data such that the data A is written into the even number memory bank 11 starting from this specified bit address and the data B is written in the succeeding odd number memory bank 12. The LSB A0 of the address data on the address bit 13 is changed to 37 0", so resulting in the same address bits A1 through Ak being inputted to both the memory banks 11 and 12. Consequently, in both the memory banks 11 and 12 the data taken from the data bus 15 is cyclically shifted rightward by the number of bits specified by the bit address data BA. Next, the bit boundary control data CTL causes only set bits of the shifted byte data to be written into the memory cell array 24 and prevents the remaining bits from being written. In this case, the control is such that the various bits of the shifted byte data are subjected to a write-in control X and a non-write-in control N as shown in Table 2 in response to the value of the bit address data BA and the logic level of the bit boundary control data CTL.

inputted therein is at level "1". In the case of the odd number memory bank 12, since the bit boundary control data CTL inputted therein is at level "0", the data B which has been cyclically shifted rightward to the first fifth through positions of the cyclic shift and control circuit 26 is written into the memory cell array 24, but the remaining data in the sixth through eighth positions is not. Thus, the result is write-in of required byte data consisting of the data A and B starting from a set bit position in the even number memory bank 11 and extending into the odd number memory bank 12.

Figure 6:
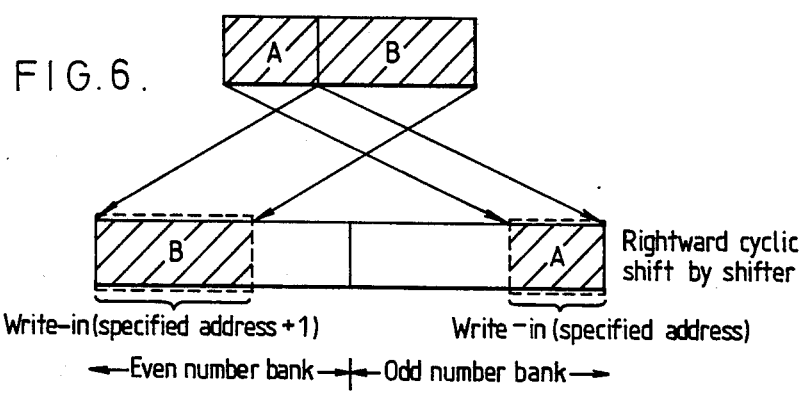
Figure 7:
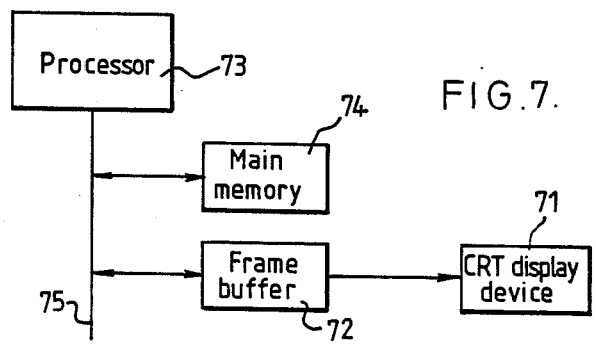
FIG. 7 is a block diagram showing a portion of a computer system that has a bit map control type CRT display device as a terminal.
Figure 8:
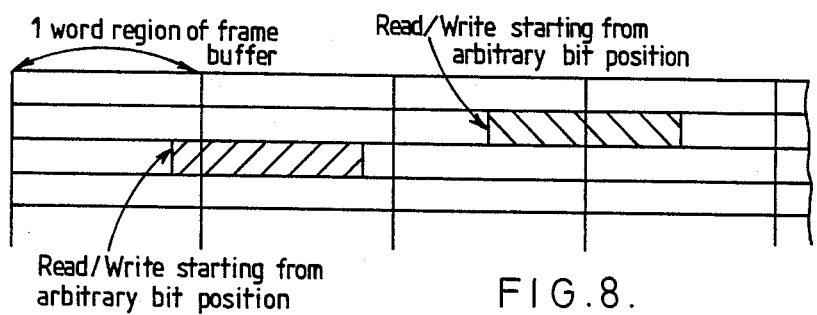
FIG. 8 is a drawing for explaining an image processing in relation to the frame buffer of FIG. 7.

(B)-2: In contrast to the case (B)-1, assume, as illustrated in FIG. 6, it is necessary to access data starting from a bit position specified by the bit address data BA in the 8 bits of data of the specified address in the odd number memory bank 12 and, starting from this specified bit position, to effect write-in on data A in the odd number memory bank 12 and of data B in the succeeding even number memory bank 11. The LSB A0 of the address data on the address bus 13 is changed to "1", so the value of the remaining address bits A1 through Ak inputted to the even number memory bank 11 is greater by "1" than the value of the remaining address bits A1 through Ak inputted to the odd number memory bank 12. This is because the even number bank 11 is incremented by the value "1" of the LSB A0 of the address data. The bit shift operations in the memory banks 11 and 12 are the same as described above when the LSB A0 of the address data is "0". However, for the odd number memory bank 12, since the bit boundary control data CTL inputted therein is now "1", if, for example, the value of the bit address data BA inputted therein is "5", the data A which has been shifted to sixth through eighth bit positions of the cyclic shift and control circuit 26 is written in. For the even number memory bank 11, the data B which has been shifted to first through fifth bit positions in the cyclic shift and control circuit 26 also is written in. The result, therefore is write-in of required byte data consisting of the data A and B starting from a set bit position in the odd number memory bank 12 and going over into the even number memory bank 11.

Since the semiconductor memory of the above embodiment has bit address 16 and the main portions of a bit boundary access function, the memory can be em-

TABLE 2

| Bit Address Data BA | State in Input/Output Buffer 25 | | | | | | | | | | | | | | | |
|---|---|---|---|---|---|---|---|---|---|---|---|---|---|---|---|---|
| | Bit Boundary Control Data CTL = 1 | | | | | | | | Bit Boundary Control Data CTL = 0 | | | | | | | |
| 0 | X | X | X | X | X | X | X | X | N | N | N | N | N | N | N | N |
| 1 | N | X | X | X | X | X | X | X | X | N | N | N | N | N | N | N |
| 2 | N | N | X | X | X | X | X | X | X | X | N | N | N | N | N | N |
| 3 | N | N | N | X | X | X | X | X | X | X | X | N | N | N | N | N |
| 4 | N | N | N | N | X | X | X | X | X | X | X | X | N | N | N | N |
| 5 | N | N | N | N | N | X | X | X | X | X | X | X | X | N | N | N |
| 6 | N | N | N | N | N | N | X | X | X | X | X | X | X | X | N | N |
| 7 | N | N | N | N | N | N | N | X | X | X | X | X | X | X | X | N |
| | MSB | | | | | | | LSB | MSB | | | | | | | LSB |

Z: write-in
N: non-write-in

It is seen from the Table 2 that if, for example, the bit address data BA has the value "5" and the LSB A0 of the address data is "0", the data of the first through fifth data positions of the cyclic shift and control circuit 26 is not written in, but the data A which is in the sixth through eighth positions as the result of a 5-bit cyclic shift rightward is written into the memory cell array 24. This is because the bit boundary control data CTL ployed directly, as it is, for the odd number memory bank 12. If the memory is used for the even number memory bank 11, memory system possessing a bit boundary access function can easily be achieved simply by external provision and connection of the adder 17 for adding the value of the LSB A0 of the address data to the value of the remaining address bits A1 through Ak from the address bus 14, and adding the inverter 18 for inverting the LSB A0 of the address data from the address bus 13 and supplying the inverted result to the even number memory bank 11 as the bit boundary control data CTL.

It is possible to produce a semiconductor memory with a bit boundary access function without using connection of external circuits, although there are the problems of increased chip size and adder and inverter circuit redundancy on the odd number memory bank 12 if the adder 17 and the inverter 18 are formed on the memory chip.

Although the above embodiment was described with reference to a semiconductor memory with a one word equals 8 bits structure, the invention is, of course, also applicable to semiconductor memories with any other bit structure.

Further, although the embodiment was described with reference to a read/write semiconductor memory that can perform both the read and the write operations, the invention may be applied to a read-only semiconductor memory, in which the read-out system is only provided with a bit boundary function.

As described above, since the semiconductor memory of the present invention possesses a bit boundary access function, if it is used as, for example, a frame buffer for temporarily storing display data for a bit map control type display device, an image processing unit that can carry out processing for image rotation, enlargement and reduction, etc. on a display device may to be produced at relatively low cost.

What is claimed is:

1. A semiconductor memory for writing or reading data words in response to prescribed bank address data and bit address data, each word having a prescribed amount of bits, the memory comprising:
   memory array means for storing the data words, the memory array means including at least two memory banks adjacent to one another, each band having a bit area corresponding to the prescribed amount of bits;
   buffer memory means for a temporarily storing at least one of the data word for writing into the memory array means and the data word read from the memory array means;
   first source means for applying the bank address data to the memory array means to access to the memory banks;
   second source means for applying the bit address data to the memory banks to access prescribed bit locations of the memory banks; and
   logic circuit means responsive to the bit address data for cyclically shifting the data word stored in the buffer memory means by an amount corresponding to the value of the received bit address data.

2. The memory of claim 1, wherein the logic circuit means includes an output control circuit responsive to a read/write signal for changing the buffer memory means between the read operation mode and the write operation mode and for determining the direction of the cyclic shifting.

3. The memory of claim 2, wherein the logic circuit means includes a shift control circuit for respectively effecting control to establish high impedance states and normal output states in response to the LSB of the bank address data as well as to the values of said bit address data.

4. The memory of claim 3, wherein the logic circuit means includes a control circuit for said output control circuit for a read-out control to respectively effect control to establish high impedance states and to determine bit positions at which read-out is effected in response to the LSB of the bank address data as well as to the values of said bit addresses.

5. The memory of claim 3, wherein the logic circuit means includes a control circuit for said output control circuit for a write-in control to respectively effect control to establish write-in states and to determine bit positions at which write-in is effected in response to the LSB of the bank address data as well as to the values of said bit addresses.

* * * * *